United States Patent [19]
Light, Jr. et al.

[11] Patent Number: 5,522,939
[45] Date of Patent: Jun. 4, 1996

[54] METHOD OF REMOVING PLASTIC MATERIAL FROM OPTICAL FIBER CABLE

[75] Inventors: Martin C. Light, Jr., Taylorsville; Alan T. Parsons, Hickory, both of N.C.

[73] Assignee: Siecor Corporation, Hickory, N.C.

[21] Appl. No.: 226,576

[22] Filed: Apr. 12, 1994

[51] Int. Cl.⁶ ...................................................... B08B 7/00
[52] U.S. Cl. ........................ 134/6; 134/9; 134/15; 134/38; 134/40; 134/42
[58] Field of Search ............................... 134/6, 4, 15, 38, 134/40, 42, 9; 252/135, 174.17, 164, 163, 162, 139, 140, 170

[56] References Cited

U.S. PATENT DOCUMENTS 2,765,257  10/1956  Blackburn ........................... 252/554
3,998,654  12/1976  Falaas et al. ........................... 134/4
5,077,038  12/1991  Hofmann ........................... 134/38

OTHER PUBLICATIONS

AT&T Publication, 3 Mar. 1991.

*Primary Examiner*—Zeinab El-Arini
*Attorney, Agent, or Firm*—J. David Abernethy

[57] ABSTRACT

A method of removing a cured plastic matrix material from a fiber optic ribbon includes applying thereto a composition of matter comprising a solvent and a filler. The filler is selected from the group consisting of fumed silica and cornstarch, and the solvent is selected from the group consisting of ethyl acetate, butyl acetate, and mixtures thereof.

6 Claims, 2 Drawing Sheets

METHOD OF REMOVING PLASTIC MATERIAL FROM OPTICAL FIBER CABLE

BACKGROUND

This invention relates to a unique gel composition, composed of either ethyl acetate or butyl acetate, or a mixture of both ethyl acetate and butyl acetate, and method of using same to remove matrix material from matrix enclosed optical fibers, e.g., ribbon cable.

Optical fibers, in the form they are received from the manufacturer, usually comprise a glass core circumscribed by a glass cladding. Circumscribing this glass portion is a first and then a second plastic coating usually made from polyurethane acrylate, the first and inner layer having a lower modulus than the outer layer. See U.S. Pat. No. 5,181,268 for an example, the contents of which are incorporated herein by reference. From such fibers either a loose tube, a ribbon, or a tight buffered cable can be made.

In the case of ribbon cable, a plurality of as received fibers are aligned, one to another, and are circumscribed by what is called a matrix. The matrix bonds the fibers one to another in a planer or ribbon configuration. Usually the matrix is UV-cured polyurethane acrylate. In the field there comes a time when the terminal ends and/or mid-span portion of the ribbon cable must be stripped of its matrix so that fiber ends of the optical fibers are exposed and made accessible for splicing to a fiber end of another cable.

Stripping the matrix of optical fiber cables, such as ribbon cable, has in the past been accomplished by soaking the terminal or mid-span portion of a cable sought to be stripped in either ethyl alcohol or acetone. Acetone has been objected to because of its strong odor and propensity to chemically attack other cable components and ethyl alcohol is not effective on most ribbon matrix materials presently used. Customers such as the Regional Bell Operating Companies, when faced with use of these compounds, have required an alternative. This invention is directed towards a solution to this problem.

BRIEF DESCRIPTION OF THE INVENTION

The invention comprises the use of a gel comprising: (a) ethyl and/or butyl acetate; (b) a filler, which acts as a thickening agent, and optionally (c) a fragrance enhancer. A fragrance enhancer is generally not necessary if butyl acetate is employed. Such a mixture causes the matrix of a ribbon or other tight buffered optical fiber cable to soften, swell and break up. Removing the matrix material with a fibrous scouring pad, exposing optic fibers in their as-received state, is the last step.

DETAILED DESCRIPTION OF THE INVENTION

Shown by FIGS. 1–8 are the mechanical steps used to access a given fiber at mid-span. Matrix material may be removed from a ribbon cable terminal portion in much the same fashion.

Figure 1:
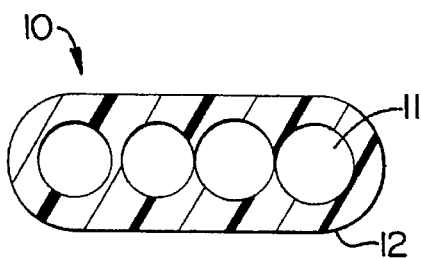
FIGS. 1–8 show a typical procedure for access to a given fiber or fibers at mid-span of a fiber optic ribbon cable.
Figure 2:
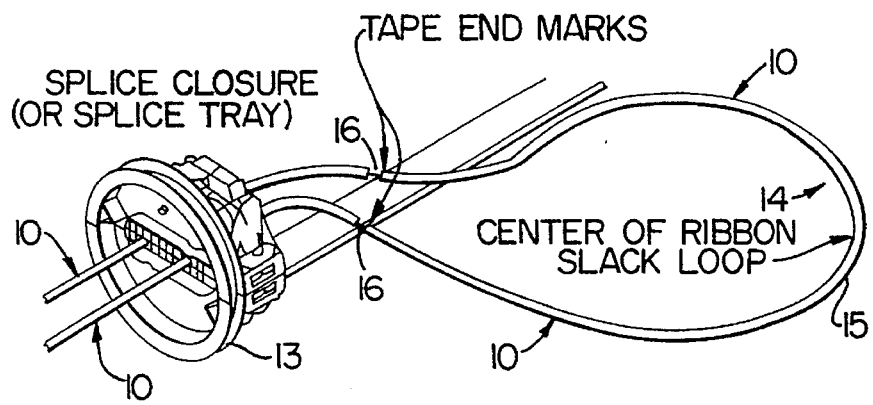

Shown by element 10 of FIG. 1 is a cross-section of a typical prior art ribbon cable, with optical fibers 11 circumscribed by ribbon matrix 12. It is the removal of matrix 12 that is the result of the following described steps. In FIG. 2, there is shown a splice closure or splice tray 13 in which ribbon cable 10 enters and exits leaving a loop or slack as shown by element 14. Near the center 15 of loop 14 access to one or more fibers is desired. Taping the loop 14 at position 16 delimits the portion of loop 14 desired to be accessed.

Figure 3:
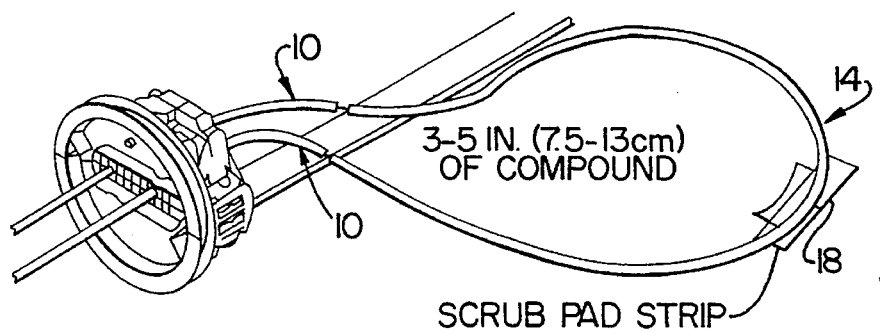
Figure 4:
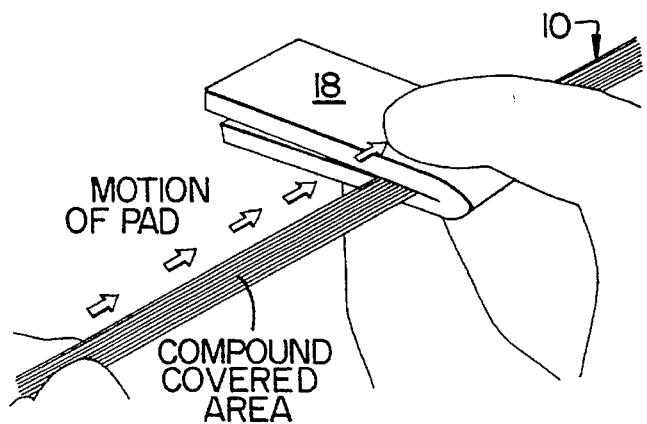
Figure 5:
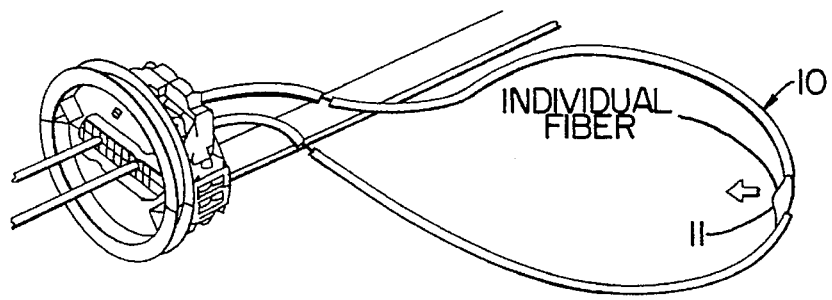
Figure 6:
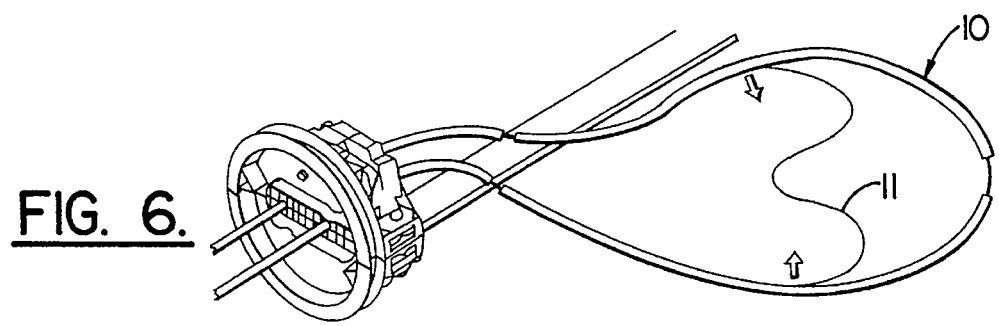

As shown in FIG. 3, a marked section of ribbon to be accessed (between tapes 16) is placed on top of scrub pad strip 18, impregnated with the ethyl and/or butyl acetate gel as hereafter described. Both sides of loop 14 are coated with the ethyl and/or butyl acetate gel. After thoroughly applying the gel to ribbon loop 14, the coated section is placed on the scrub pad strip 18 and allowed to sit for 5 to 10 minutes. Optionally, the coated section can be wrapped in a non-absorbent plastic or treated paper sheet to reduce evaporation of the ethyl acetate and/or butyl acetate from the gel. This period of time has been found appropriate for most matrix materials (for example, polyurethane acrylate) having a matrix thickness between 20–50 microns. The acetate gel causes the plastic matrix to swell and soften. After the above described waiting period, the scrub pad is used as shown in FIG. 4. Pad 18 is folded over the gel coated area of ribbon cable 10 and wiped over such area by starting from the same end each time and sliding the folded plastic pad 18 in the same direction until the ribbon matrix 12 has been removed.

Figure 7:
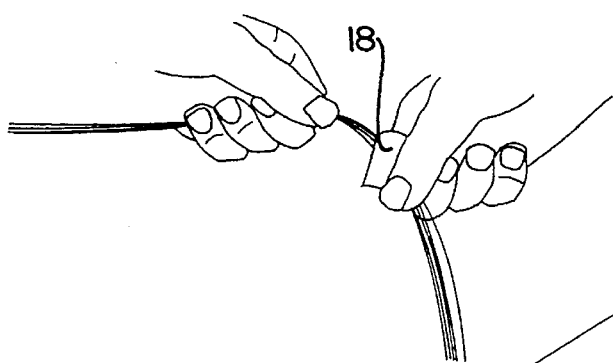
Figure 8:
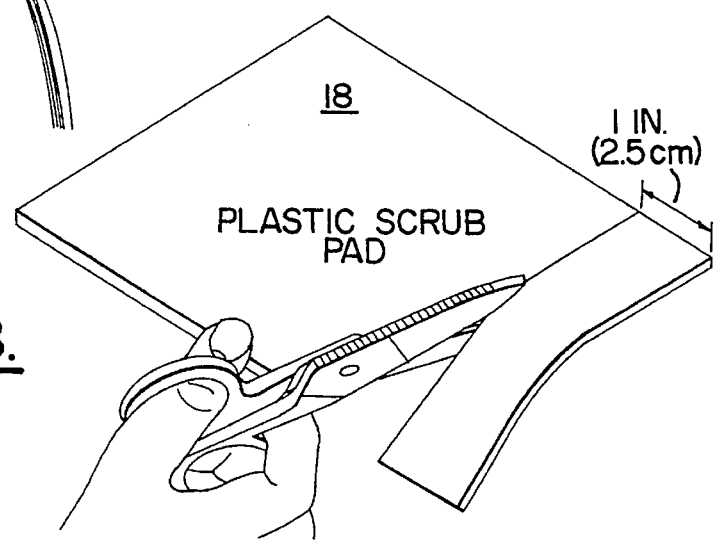

Working from an outside edge, one fiber at a time is grasped and broken out along the entire length of loop 14. See FIGS. 5 and 6. Any remnants of ribbon matrix 14 can be removed by a wiping action as shown in FIG. 7. Verification that all of the matrix material has been removed can be made by running fingers along the fibers. If they feel and appear uniform in dimension and texture, then the matrix material has been removed and fibers are ready for splicing as desired. Scrub pad 18 can be made from any plastic or animal fiber content not soluble in ethyl or butyl acetate. A pad of plastic fibers sold in grocery stores under the mark "Scotch Brite" has proven satisfactory.

Various percentages of the gel components have been used and found to be sufficient. Examples of such are as follows:

|  | % By Volume | | | |
| --- | --- | --- | --- | --- |
| Ethyl Acetate | 0 | 10 | 20 | 30 |
| Butyl Acetate | 30 | 20 | 10 | 0 |
| Filler | 70 | 70 | 70 | 70 |

| Gel Mixture | % By Volume | | | | | |
| --- | --- | --- | --- | --- | --- | --- |
| Solvent | 30 | 32 | 34 | 36 | 38 | 40 |
| Filler | 70 | 68 | 66 | 64 | 62 | 60 |

| Solvent Mixture | % By Volume | | | | | |
| --- | --- | --- | --- | --- | --- | --- |
| Ethyl Acetate | 100 | 80 | 60 | 40 | 20 | 0 |
| Butyl Acetate | 0 | 20 | 40 | 60 | 80 | 100 |

| Preferred Embodiments | % By Volume | | | | |
| --- | --- | --- | --- | --- | --- |
| Ethyl Acetate | 0 | 10 | 20 | 30 | 40 |
| Butyl Acetate | 40 | 30 | 20 | 10 | 0 |
| Filler | 60 | 60 | 60 | 60 | 60 |

Solvent is butyl acetate or ethyl acetate or mixtures thereof.
See Table below.
Filler is fumed silica or cornstarch.

The example formulations were prepared and applied as set forth in the above explanation of FIGS. 1–8. Instead of applying the gel by a plastic pad 18 the gel may be packaged in a tube, foil packet, or a syringe and applied like applying toothpaste to the cable matrix. It is obvious that the applying medium must be essentially insoluble in butyl and/or ethyl acetate, either per se or in gel form.

Ethyl acetate has a disagreeable odor and may be used with a fragrance enhancer (up to 14% by volume), which can be obtained from Atlanta Fragrance, Inc. or Aromatics Flavors, Inc., both of Atlanta, Ga. A fragrance can be used with butyl acetate but ordinarily is not necessary. Fumed silica can be obtained from Degussa Corp of Richfield Park, N.J. and has a particle size in the range of 7 to 40 nanometers, and the ethyl and butyl acetate can be secured from Fisher Scientific, Inc. of Atlanta, Ga.

A variety of modifications which do not depart from the scope and spirit of the invention will be evident to persons or ordinary skill in the art from the disclosure herein. The following claims are intended to cover the specfic embodiments set forth herein as well as modifications, variations, and equivalents.

We claim:

1. A method of removing a cured plastic matrix from a fiber optic ribbon comprising optical fibers in a cured plastic matrix material, said method comprising:

(a) providing a composition of matter comprising a solvent and a filler wherein said filler is selected from the group consisting of fumed silica and cornstarch and does not exceed 70% by volume and said solvent is selected from the group consisting of ethyl acetate, butyl acetate and mixtures thereof and does not exceed 40% by volume; and, (b) applying the composition of matter to the cured plastic matrix of the fiber optic ribbon for a time sufficient to soften said plastic matrix; and removing said softened plastic matrix from the optical fibers.

2. The method of claim 1 wherein said mixtures of said ethyl acetate and butyl acetate contains between 80 and 20 percent by volume of butyl acetate.

3. The method of claim 1 wherein said filler does not exceed 60% by volume, said butyl acetate and ethyl acetate do not exceed 40 percent by volume.

4. The method of claim 1 wherein said ethyl acetate does not exceed 30% by volume and said butyl acetate does not exceed 30% by volume.

5. The method of claim 1 wherein removing the plastic matrix from the optical fibers is achieved by a fibrous pad.

6. The method of claim 1 wherein the fumed silica has a particle size between 7 and 40 nanometers.

* * * * *